United States Patent [19]

Stover

[11] Patent Number: 4,666,355
[45] Date of Patent: May 19, 1987

[54] TOP GRIP LOCK NUT ASSEMBLY
[75] Inventor: David R. Stover, Chicago, Ill.
[73] Assignee: USG Industries, Inc., Chicago, Ill.
[21] Appl. No.: 892,562
[22] Filed: Aug. 4, 1986
[51] Int. Cl.[4] .......................... F61B 37/04; F61B 41/00
[52] U.S. Cl. ..................................... 411/85; 411/104; 411/112; 411/432; 411/520
[58] Field of Search .................... 411/84, 85, 103, 104, 411/105, 106, 107, 108, 111, 112, 113, 182, 349, 401, 427, 432, 516, 520, 966, 525, 527

[56] References Cited

U.S. PATENT DOCUMENTS

| 2,233,242 | 2/1941 | Burke | 411/349 |
| 2,373,312 | 4/1945 | Hughes | 411/527 |
| 2,382,936 | 8/1945 | Bedford | 411/527 |
| 2,727,552 | 12/1955 | Chvosta | 411/112 |
| 4,263,952 | 4/1981 | Kowalski | 411/112 |
| 4,285,379 | 8/1981 | Kowalski | 411/85 |
| 4,395,062 | 7/1983 | t'Geppert | 411/349 |
| 4,410,298 | 10/1983 | Kowalski | 411/104 |
| 4,460,299 | 7/1984 | Kowalski | 411/85 |
| 4,575,295 | 3/1986 | Rebentisch | 411/85 |

FOREIGN PATENT DOCUMENTS

| 1923321 | 11/1969 | Fed. Rep. of Germany | 411/112 |
| 2911627 | 9/1980 | Fed. Rep. of Germany | 411/104 |
| 2468784 | 5/1981 | France | 411/85 |

Primary Examiner—Thomas J. Holilo
Attorney, Agent, or Firm—Robert M. Didrick; Samuel Kurlandsky; Robert H. Robinson

[57] ABSTRACT

A pair of legs depending from the ring of a lock nut carrier pass through oppositely disposed arcuate slits in a spring clip and cleave to the lock nut so that the spring clip will support the nut within a metal channel framing member. The carrier and nut are locked into position ready to receive a fastener by pushing down on the carrier and spring clip with a thumb or finger and rotating the carrier legs within the arcuate slits.

15 Claims, 9 Drawing Figures

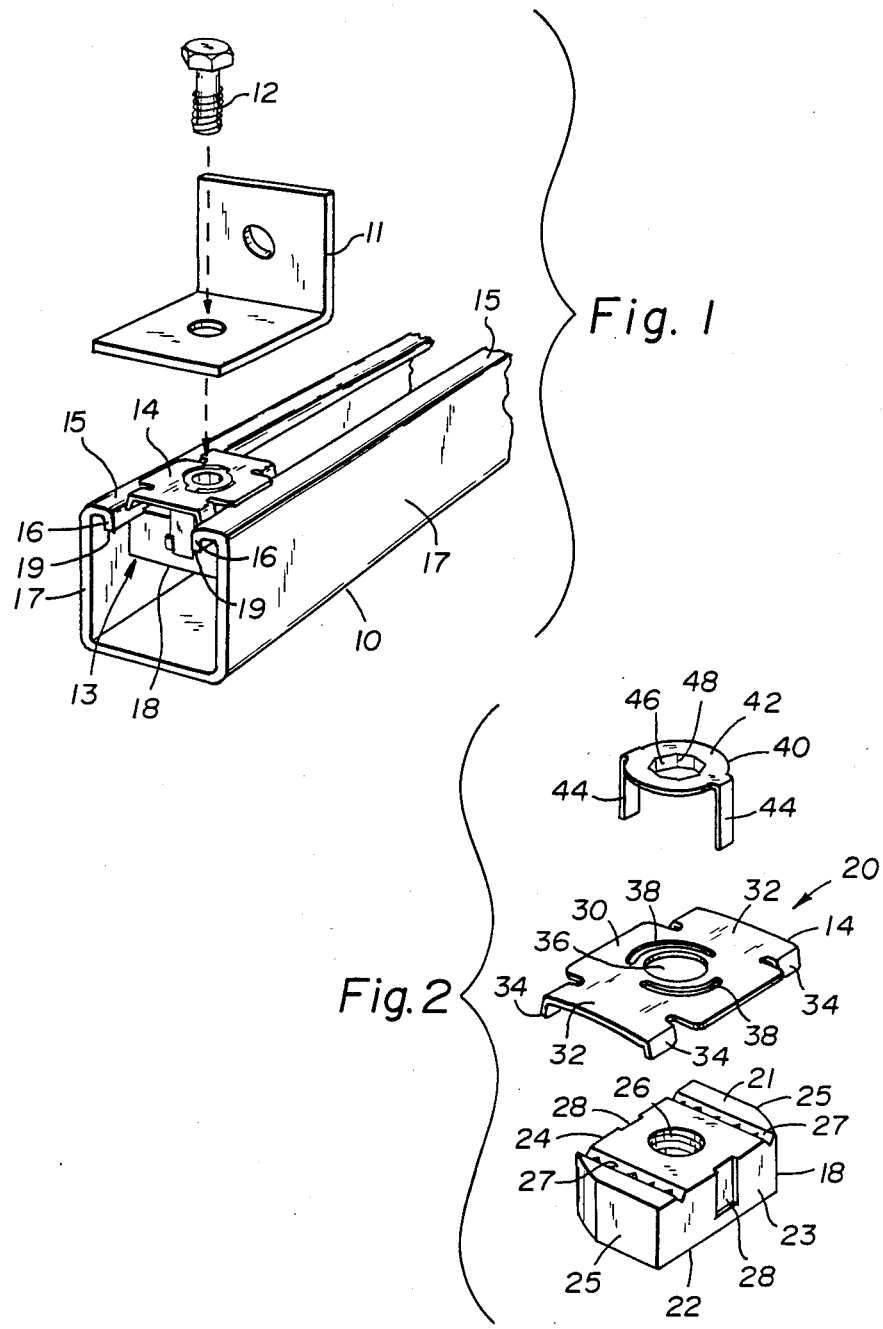

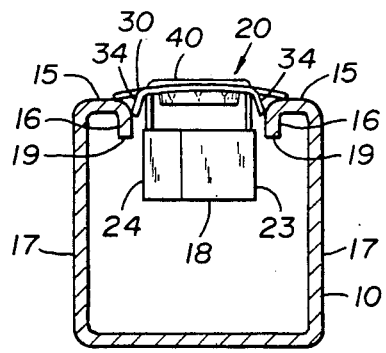
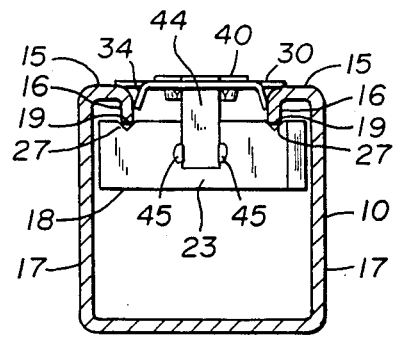
Fig. 3
Fig. 4
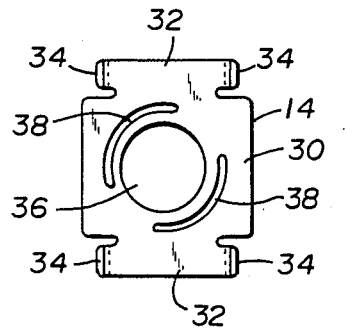
Fig. 5
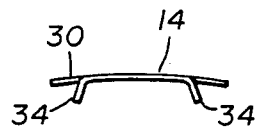
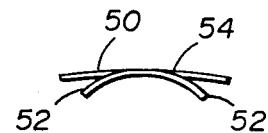
Fig. 6
Fig. 7

TOP GRIP LOCK NUT ASSEMBLY

This invention relates generally to fasteners for holding objects on metal channel framing and particularly to an assembly for clamping a lock nut or stud nut in the channel prior to and during attachment of the object to the channel framing member.

Electrical conduit, pipes, motors, fixtures and the like are often fastened to overhead or vertical framing made up of metal channels having side flanges with hook-like extensions which define a slot therebetween which is narrower than the open channel or trough defined by the flanges proper and the base. The extensions have horizontal ledge segments and vertical skirt segments which extend toward the base of the channel. Typically, a lock nut or stud nut, both of which are narrower but longer than the width of the slot, is used to secure objects to the metal channel. The nut is passed through the slot and turned 90° to a crosswise position within the trough of the metal channel. This may be done by hand but the nut is often made inaccessible by the size and shape of the object being fastened to the channel. Various means have been used heretofore for holding the upper face of the nut against the lower edges or lips of the hook-like exensions while the object is being fastened.

One such means is a coil compression spring on the lower face of the nut which reacts against the base of the metal channel when the nut is inserted into the slot and turned; the spring pushes the upper face of the nut against the channel's lips. The spring, however, blocks the passage of conduit, wires and the like and thus prevents the use of the channel as a raceway.

Another prior art means is a cradle for the nut. Spring fingers on the cradle extend upwardly from the upper face of the nut at opposite ends thereof. The spring fingers bear against the ledges of the hook-like extensions and pull the nut up against the channel lips when it is turned to its crosswise position. In cradle, however, lacks means for preventing it and the nut from falling into the trough of the metal channel before the assembly is turned to engage the spring fingers.

Another prior art means is the clamp taught in U.S. Pat. No. 4,410,298. The clamp is made up of a ring, a pair of diametrically opposed arms extending downward from the inner periphery of the ring, and a pair of legs extending downward at the remaining quarter points on the ring. The diameter of the ring is greater than the width of the nut but less than its length; it is large enough to allow the ring to rest on the ledges of the metal channel regardless of the position of the nut. The arms have turned-in fingers which enter slots in opposite sides of the nut. The legs keep the nut in a parallel, spaced apart position relative to the ring when the assembly is not secured to the metal channel. Such an assembly does not prevent misalignment of a lock nut within the metal channel caused by torque on the assembly when the fastening bolt is finally tightened. Misalignment of the grooves on the upper surface of the nut and the lips of the metal channel permits slippage of the nut and the attached object along the channel.

Some of the prior art appliances require the use of a special tool to push the nut below the channel lips and turn it to engage the lips.

It is an object of this invention, therefore, to provide an assembly for holding a lock nut within a channel framing member which may be easily manipulated by a thumb or finger.

It is an object of this invention to provide a lock nut holding assembly which prevents misalignment of the nut when torque is applied through the tightening of a bolt therein.

It is another object of this invention to provide a lock nut holding assembly which may be moved along the length of a metal channel to a desired position after insertion in the channel but before the nut is drawn up tightly against the metal channel lips by a fastening bolt.

It is a related object of this invention to provide a spring clip which cooperates with a lock nut carrier to hold the lock nut within a metal channel before and during the fastening of an object to the metal channel by turning a bolt into the nut.

These and other objects of this invention which will become apparent from the following description are achieved by the devices illustrated in the accompanying drawings, wherein:

FIG. 1 is an exploded perspective view of a portion of a metal channel framing assembly of this invention and an angle iron fastened thereto.

FIG. 2 is an exploded perspective view of a fastener assembly of this invention showing the relationship of the parts thereof.

FIG. 3 is an end elevation of a metal channel framing assembly showing the assembly of FIG. 2 in its unlocked position within the metal channel.

FIG. 4 is like FIG. 3 except that the assembly is in its locked position.

FIG. 5 is a plan view of one embodiment of the spring clip of this invention.

FIG. 6 is an end elevation of the spring clip of FIG. 5.

FIG. 7 is an end elevation of another embodiment of the spring clip of this invention.

Figure 8:
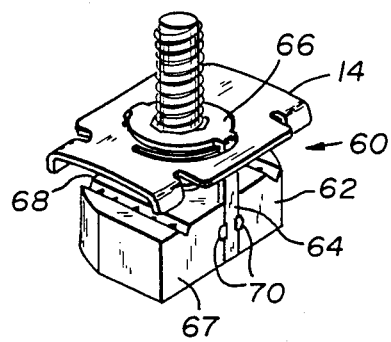
FIG. 8 is a perspective view of another fastener assembly of this invention.

In FIG. 1, the metal channel 10 represents a portion of a framing assembly to which objects such as the angle iron 11 are fastened by the bolt 12 and the fastener assembly 13 which is secured to the channel 10 by resilient engagement of the spring clip 14 with the ledges 15 and skirts 16 which are extensions of the flanges 17 of the channel. The resilience of the spring clip 14 urges the lock nut 18 up against the lips 19 of the skirts 16.

In FIG. 2, the lock nut 18 of the fastener assembly 20 has an upper face 21, a lower face 22, an anterior face 23, a posterior face 24, and lateral faces 25. The centrally disposed threaded bore 26 is flanked by the grooves 27 which are at right angles to the anterior and posterior faces 23 and 24. The central portions of faces 23 and 24 are broached to form the rabbets 28. The spring clip 14 has the convex central plate 30 and the oppositely disposed leaves 32 which are also convex but whose fingers 34 at the free ends thereof extend below the central plate at an oblique angle with respect to the horizontal tangent to the leaf. The circular hole 36 is centrally disposed in the plate 30 and is coaxial with the opposed arcuate slits 38. The carrier 40 for the lock nut 18 is made up of the ring 42, the legs 44 which depend from diametrically opposite segments of the outer edge of the ring, and the collar 46 which depends from the inner periphery of the ring. The collar 46 is fluted as at 48 to provide for excess drawn metal during the manufacture of the carrier 40 and also to accommodate a tool if it is desired to use one to turn the carrier as explained later. A serrated or notched collar is equivalent to a fluted collar for the purposes of this invention.

The assembly 20 of FIG. 2 is put together by passing the legs 44 down through the arcuate slits 38 of the spring clip 14 and into the rabbets 28 on the lock nut 18. The legs 44 may be anchored in place on the nut by the stakes 45 as shown in FIG. 4 or by one of several suitable methods, e.g., gluing, spot welding, or soldering.

In FIG. 3, the assembly 20 rests within the metal channel 10 with the anterior face 23 and posterior face 24 of the lock nut 18 parallel to the flanges 17 of the channel 10. The central plate 30 straddles the slot between the skirts 16 and rests on the opposite ledges 15 of channel 10. The fingers 34 of the leaves 32 abut the skirts 16. The convex curvature of the plate 30 holds the carrier 40 above the horizontal plane of the ledges 15 and the carrier, in turn, holds the lock nut 18 up so that its upper surface is above the horizontal plane defined by the lips 19 of channel 10. In FIG. 4, the carrier 40, lock nut 18, and the plate 30 have been pushed down by thumb pressure and the carrier turned clockwise through 90° to align the grooves 27 of the nut 18 with the lips 19. The plate 30 has been flattened to about the level of the ledges 15 but its resilience works to pull the nut 18 up against the lips 19. Alignment of the grooves 27 with the lips is maintained by the abutment of the fingers 34 against the skirts 16 when further clockwise torque is transferred to the nut 18 during the tightening of a bolt to fasten an object to the channel 10.

The spring clip 50 of FIG. 7 has the cruciform shape of the spring clip 14 of FIG. 5 but the leaves 52 have a convex curvature throughout their length whereas the leaves 32 are gently convex in their middle portions but are more sharply bent to form the fingers 34 as seen in FIG. 6. The radius of curvature of the leaves 52 is about one-third of that of the central plate 54 of the spring clip 50. Although the leaves 52 perform satisfactorily, the leaves 32 with their more nearly vertical fingers 34 are preferred because they faiclitate the sliding of the assembly 20 along the length of the channel 10 to a desired location prior to the fastening of an object at such location.

In FIG. 8, the fastener assembly 60 is shown ready for insertion in the slot of the metal channel 10. This assembly is similar to the assembly 20 except that the lock nut 18 is replaced by the stud nut 62 and the legs 64 of the carrier 66 extend to and wrap around the lower surface of the stud nut. To accommodate the extended legs, the anterior and posterior faces 67 and 68 of the nut 62 are rabbeted from top to bottom. The legs 64 are anchored by the stakes 70 which are formed by the lateral flow of metal from said faces 66 when struck sharply by a punch.

Figure 9:
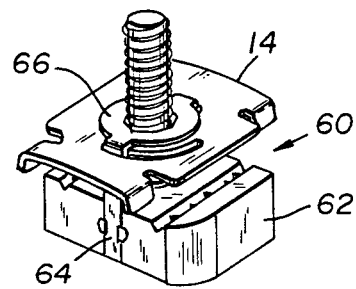
FIG. 9 is like FIG. 8 except that all but the spring clip has been rotated rotated through 90°.

In FIG. 9, the stud nut 62 and the carrier 66 have been rotated through 90° with respect to the spring clip 14 to illustrate the posture of the assembly 60 when it is locked within the channel 10.

A sheet of spring steel, preferably 28-31 gauge (B.W.G.) and more preferably a 30 gauge sheet of 302 stainless, is stamped and rolled to form the spring clips 14 and 50. For the carriers 40 and 66, a 23-26 gauge sheet of 302 stainless is preferred. Fabrication of both components from modern engineering plastics is contemplated, however.

While specific embodiments of the invention have been described in detail, it is understood that various modifications thereof may be made within the spirit and scope of the following claims.

The subject matter claimed is:

1. A fastener assembly retainable within a metal channel framing member, said assembly comprising:
   a fastener body having an upper face, a lower face, elongate anterior and posterior faces, two laterally opposite faces, and a threaded, cylindrical fastening means centrally disposed with respect to the upper face;
   a generally cross-shaped spring clip superposed above the fastener body, said clip having a convex central plate and a pair of oppositely disposed leaves partially severed from the plate, each leaf having a pair of free ends which extend below the plate; said plate having a hole therein in alignment with the threaded fastening means, and a pair of opposed arcuate slits coaxial with the hole; and
   a fastener body carrier rotatably coupled with the spring clip, said carrier having a ring and a pair of diametrically opposed legs dependent from the ring which pass through the respective slits in the spring clip and cleave to the anterior and posterior faces of the fastener body.

2. The assembly of claim 1 wherein the arcuate slits of the spring clip are diagonally opposed.

3. The assembly of claim 1 wherein the anterior and posterior faces of the fastener body each have a centrally disposed vertical groove into which the respective carrier legs are fixed.

4. The assembly of claim 1 wherein the ring of the carrier has a fluted collar dependent from the inner periphery of the ring.

5. The assembly of claim 1 wherein the upper face of the fastener body has a groove on each side of the fastening means normal to the anterior face and the legs of the fastener body carrier are rotatable through an angle of about 90° within the arcuate slits of the spring clip.

6. The assembly of claim 1 wherein the diameter of the ring of the fastener body carrier and the diameter of the cylindrical fastening means are substantially equal.

7. The assembly of claim 2 wherein the anterior and posterior faces of the fastener body each have a centrally disposed vertical rabbet into which the respective carrier legs are fixed, the ring of the carrier has a fluted collar dependent from the inner periphery of the ring, and the fastener body and its carrier are rotatable through an angle of about 90° with respect to the spring clip.

8. A spring clip having a generally cruciform shape and having a convex central plate and a pair of oppositely disposed leaves partially severed from the plate, each leaf having a pair of free ends which extend below the plate, said plate having a centrally disposed hole therein and a pair of opposed arcuate slits coaxial with the hole.

9. The spring clip of claim 8 wherein the leaves have a convex curvature throughout their length.

10. The spring clip of claim 8 wherein a free end of a leaf is inclined at an oblique angle to the horizontal tangent to the leaf.

11. The spring clip of claim 8 wherein the arcuate slits are diagonally opposed.

12. A metal channel framing assembly adapted to support an object, said assembly comprising:
   an elongate, generally U-shaped metal channel having a base, a pair of flanges spaced apart by the base to define an open channel, a ledge extending inward from each flange, a skirt extending toward the base from each ledge, and a lip terminating each skirt, the skirts together defining a slot narrower than the open channel;

a generally cross-shaped spring clip spanning the slot of the metal channel and bearing down on the ledges, said spring clip having a central plate and a pair of convex leaves disposed at opposite sides of the plate and which are jammed between the skirts defining the slot, the plate having a centrally disposed hole therein and a pair of opposed arcuate slits coaxial with the hole;

a fastener body carrier rotatably coupled with the spring clip, said carrier having a ring which bears down upon the central plate and a pair of diametrically opposed legs dependent from the ring which pass through the respective slits in the plate; and a fastener body set between the legs of the carrier, the body having an upper face pressed against the lips of the metal channel, a lower face, an anterior face and a posterior face in engagement with a respective leg of the carrier, two laterally opposite faces, and a threaded cylindrical fastening means aligned with the hole in the plate of the spring clip and with the ring of the carrier.

13. The assembly of claim 12 wherein the slits of the spring clip are diagonally opposed.

14. The assembly of claim 12 wherein the anterior and posterior faces of the fastener body each have a centrally disposed rabbet into which the respective carrier legs are fixed.

15. The assembly of claim 12 wherein the ring of the carrier has a fluted collar dependent from the inner periphery of the ring.

* * * * *